UNITED STATES PATENT OFFICE.

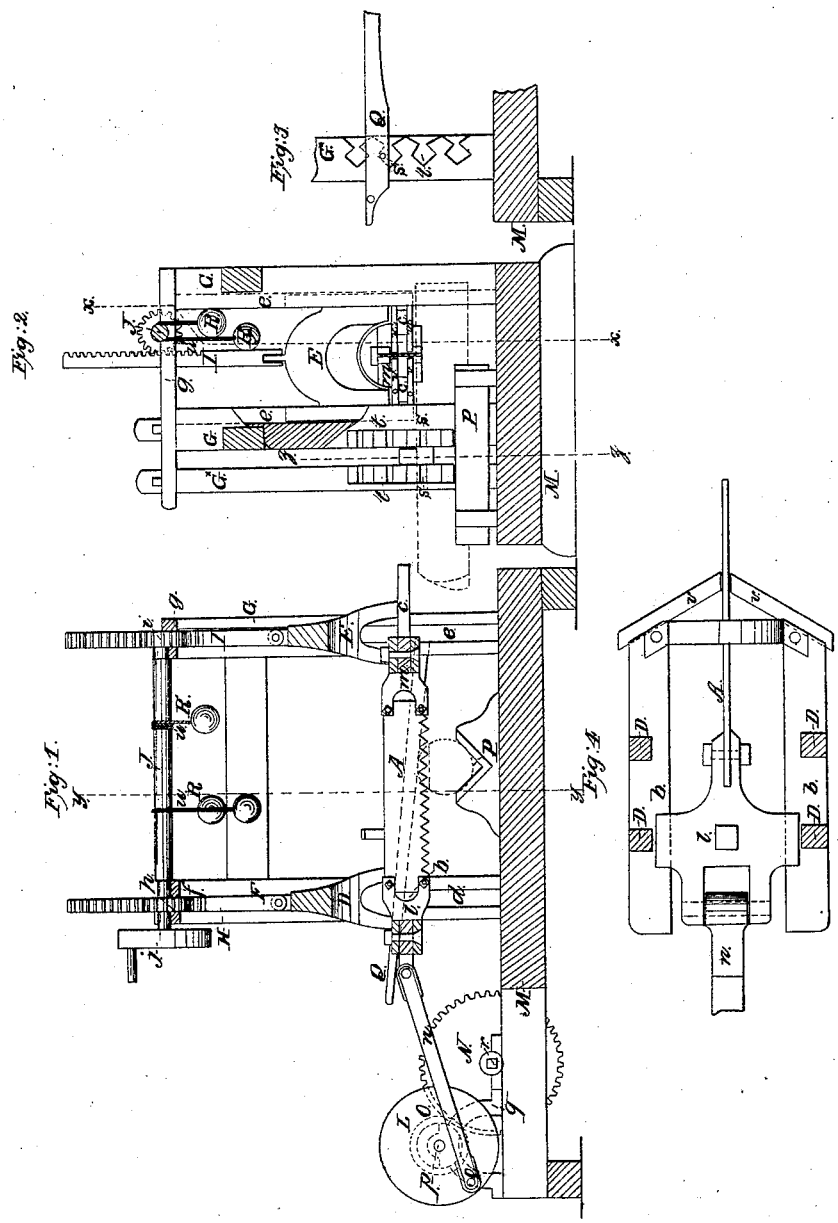

HENRY J. MILLER, OF SHANESVILLE, OHIO.

IMPROVEMENT IN SAWING-MACHINES.

Specification forming part of Letters Patent No. 45,847, dated January 10, 1865.

*To all whom it may concern:*

Be it known that I, H. J. MILLER, of Shanesville, in the county of Tuscarawas and State of Ohio, have invented a new and Improved Sawing-Machine; and I do hereby declare that the following is a full, clear, and exact description thereof, which will enable others skilled in the art to make and use my invention, reference being had to the accompanying drawings, making a part of this specification, in which—

Figure 1 is a longitudinal vertical section of this invention taken in the plane indicated by the line $x\ x$, Fig. 2. Fig. 2 is a transverse section of the same, the plane of section being indicated by the line $y\ y$, Fig. 3. Fig. 3 is a partial section of the same taken in the plane indicated by the line $z\ z$, Fig. 2. Fig. 4 is a partial horizontal section of the same.

Similar letters of reference in the four views indicate corresponding parts.

This invention consists in the application of two pairs of slides suspended from vertically-adjustable forks, in combination with a saw secured to cross-heads, to which a reciprocating motion is imparted by hand, steam, or any other suitable power in such a manner that a log placed under the saw is exposed to the full weight of said saw, augmented by that of slides, cross-heads, and forks, and by these means the operation of sawing is effected in an expeditious and easy manner.

The invention consists, further, in the arrangement of adjustable guides to the inner ends of the slides and on the opposite sides of the saw in such a manner that the saw is securely guided on either side of the log and prevented from springing or bending.

It consists, finally, in the application of a rotary shaft having two weights suspended from ropes which wind on it in opposite directions, and being provided with pinions which gear in toothed racks rising from the forks, that are secured to the slides in which the saw moves in such a manner that by one of the weights the weight exerted by the saw on the log is diminished and by the other increased, and that by the use of these two weights the feed of the saw can be regulated at pleasure.

A represents the saw, which is secured to two cross-heads, $l\ m$, moving on slides $b\ c$. These slides are secured to the lower ends of forked standards D E, which move up and down in grooves $d\ e$ in the inner sides of the uprights F G, and which are suspended from toothed racks H I, as clearly shown in Figs. 1 and 2 of the drawings. These racks extend through mortises in the upper cross-bars, $f\ g$, which connect the uprights F G, and they gear in pinions $h\ i$, which are mounted on a horizontal arbor, J, having its bearings on the cross-bars $f\ g$. A hand-wheel, $j$, secured to the end of this arbor, serves to turn the same and to raise or lower the saw, and a pawl, $k$, hinged to a pivot, which is inserted in one of the uprights F, and which can be made to engage with a tooth in the circumference of said hand-wheel, serves to retain the saw at any desired height for the purpose of changing the log or the position of the log to be cut.

The saw is secured to the cross-heads $l\ m$, moving backward and forward on the slides $b\ c$, and one of these cross-heads connects by a pitman, $n$, with an eccentric wrist-pin, $o$, projecting from the face of a disk, L, which is mounted on the end of the shaft $p$. This shaft has its bearings in standards $q$, rising from the bed-plate M, which supports the entire mechanism, and motion is imparted to it by the action of a large gear-wheel, N, mounted on the driving-shaft $r$ and gearing in a pinion, O, secured to the shaft $p$. The wheel N and pinion O are so proportioned that by turning the driving-shaft with moderate speed a rapid reciprocating motion is imparted to the saw. Suitable guides, $v$, are secured to the inner ends of the slides $b\ c$, and these guides extend close up to the sides of the saw, so that the same is prevented from springing.

The log is placed in the triangular trough P, and it is fastened by means of a clamping-lever, Q, which is adjustable by means of a pin, $s$, in the diamond-shaped racks $t$ in the inner surfaces of the slotted upright G*, and the outer end of which is secured by means of a tooth in a serrated bar secured to one of the uprights F. By means of the diamond-shaped racks and the serrated bar the lever can be readily adjusted for logs of different thickness, and such logs can be readily fastened down in the trough or released at pleasure.

In order to regulate the weight with which the saw bears down on the log to be cut, two weights, R R', are suspended from ropes $u$ $u'$, which wind in opposite directions on the arbor J. The weight R has a tendency to turn said arbor, so that the pinions $h$ $i$ cause the toothed rack H I to ascend, and, consequently, by the action of this weight the saw will be raised or the weight with which it bears down on the log will be diminished. The weight R' has a tendency to turn the arbor J in the opposite direction and to depress the saw, or to increase the heft with which the saw bears down on the log. If both weights are equal, one will balance the other, and the saw bears down with the heft, due to its inherent weight, together with that of the slides, cross-heads, and other parts connected therewith; but by increasing or decreasing either of the weights the heft with which the saw acts on the log can be regulated at pleasure.

This sawing-machine is particularly intended for the purpose of cutting fire-wood, but it can be used with advantage for cross-cutting logs or timber of more or less thickness.

What I claim as new, and desire to secure by Letters Patent, is—

The combination of the shaft J, pinions $h$ $i$, suspending-racks H I, hangers D E, slide-ways $b$ $c$, guides $d$ $e$, cross-heads $l$ $m$, and horizontal saw A, all arranged to operate as herein specified.

HENRY J. MILLER.

Witnesses:
WILLIAM MILLER,
WM. C. BAKER.